W. L. ORRAN.
Endless-Chain Water-Wheel.
No. 207,202. Patented Aug. 20, 1878.
Fig. 1.
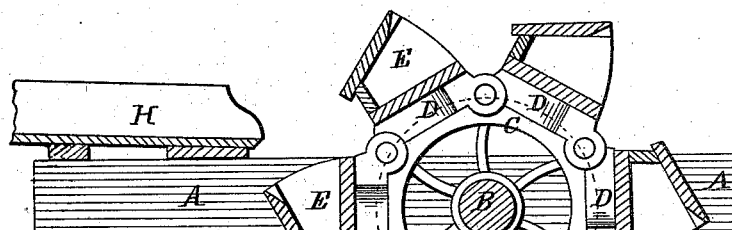
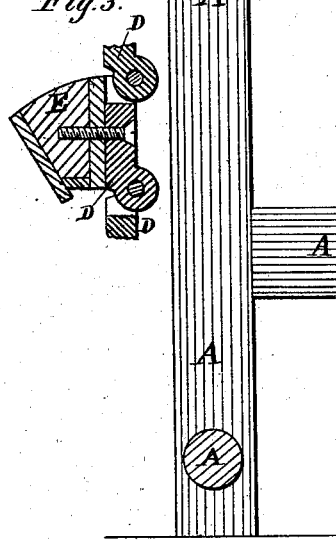
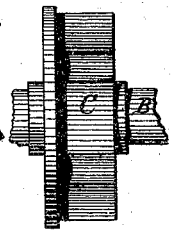
Fig. 4.
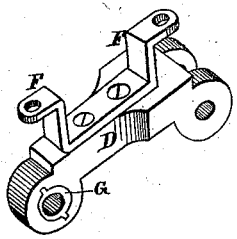
WITNESSES:
Henry N. Miller
C. Sedgwick
INVENTOR:
W. L. Orran
BY Munn & Co
ATTORNEYS.

UNITED STATES PATENT OFFICE.

WILLIAM L. ORRAN, OF MORRIS GAP, TENNESSEE.

IMPROVEMENT IN ENDLESS-CHAIN WATER-WHEELS.

Specification forming part of Letters Patent No. 207,202, dated August 20, 1878; application filed January 29, 1878.

*To all whom it may concern:*

Be it known that I, WILLIAM LAFAYETTE ORRAN, of Morris Gap, in the county of Roane and State of Tennessee, have invented a new and useful Improvement in Endless-Chain Water-Wheels, of which the following is a specification:

Figure 1 is a vertical section of my improved wheel. Fig. 2 is a detail face view of one of the chain-wheels. Fig. 3 is a longitudinal section of a part of the chain. Fig. 4 is a detail perspective view of one of the links, showing a modification.

Similar letters of reference indicate corresponding parts.

The object of this invention is to furnish an improved water-wheel, which shall be so constructed that the water may exert the full power of its weight for the longest possible time, and which shall be simple in construction and effective in operation.

The invention consists in the combination of the two shafts, the grooved and flanged chain-wheels, the links having a single lug at one end and a double lug at the other end for jointing them to each other and the buckets with each other and the frame; in the combination of the bar having its ends bent outward with the links of the endless chains to receive the buckets; and in the combination of the adjustable box or bush with the single lugs of the links of the endless chains, as hereinafter fully described.

A is the frame of the machine, to the upper and lower beams of which are attached, or in them are formed, bearings, in which revolve two shafts, B. To each of the shafts B are attached two chain-wheels, C, which have cross-grooves formed in their faces to receive the connecting-joints of the links D, and have ring-flanges formed upon their outer sides to prevent the said links from slipping out of place laterally upon the said wheels C.

The links D are made with a single lug at one end and a double lug at the other end, which lugs are so formed that the single lug of each link may fit into the space between the two parts of the double lug of the adjacent link.

The links are pivoted to each other by bolts, which may be kept in place by nuts, or may pass through one part of the double lug, through the single lug, and may screw into the other part of the double lug.

The lugs of the link D are rounded off, so as to form a smooth joint to fit into the grooves in the faces of the wheels C, to prevent the chains from slipping upon the said wheels. E are the buckets, which are bolted to the bodies of the links D. By this arrangement the buckets are attached to the outer sides of the chains D, and the said chains work upon the faces of the wheels C, so that the weight of the water is applied at the extreme end of the long arm of the lever, the short arm of which is the radius of the gear-wheel or pulley by which the power is communicated from one of the shafts B to the machinery to be driven. A still greater advantage of leverage may be obtained by attaching a bar, F, to the body of the links D and bending its end parts outward to receive the buckets E, as shown in Fig. 4.

An adjustable box or bush, G, may be placed in the bearing of the single lugs of the links D, as shown in Fig. 4, so that the chains may be lengthened and shortened by adjusting the said bushes G. The bushes G also enable the wear to be conveniently taken up.

The shafts B may be placed at such a distance apart as circumstances will permit, or as may be desired.

The lower shaft may be so low that the buckets will begin to discharge their water as they approach the tail-water, and the upper shaft should be at such a height that the buckets will receive the water as they come into a vertical position after passing over the upper wheels C.

The water is discharged into the buckets from a spout, H, attached to the top of the frame A.

With this construction the wheel will be turned by the weight of the water in all the descending buckets, so that its power will depend upon the distance apart of the shafts B and the amount of water discharged into each bucket.

Having thus described my invention, I claim as new and desire to secure by Letters Patent—

1. The combination of the two shafts B, the grooved and flanged chain-wheels C, the links D, having a single lug at one end and a double lug at the other end for jointing them to each other, and the buckets E with each other and the frame A, substantially as herein shown and described.

2. The combination of the bar F, having its ends bent outward, with the links D of the endless chains to receive the buckets E, substantially as herein shown and described.

3. The combination of the adjustable box or bush G with the single lugs of the link D of the endless chains, substantially as herein shown and described.

WILLIAM L. ORRAN.

Witnesses:
 THOMAS W. DEVANEY,
 DAVID C. KELSAYS.